(12) United States Patent
Kim et al.

(10) Patent No.: US 9,254,483 B2
(45) Date of Patent: Feb. 9, 2016

(54) CATALYSTS HAVING METAL NANO-PARTICLE CATALYST SUPPORTED ON SURFACE-TREATED NATURAL CELLULOSE FIBERS AND PREPARATION METHOD THEREOF

(71) Applicant: KOREA INSTITUTE OF ENERGY RESEARCH, Daejeon (KR)

(72) Inventors: Hee Yeon Kim, Daejeon (KR); Nam Jo Jeong, Daejeon (KR); Seong Ok Han, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 115 days.

(21) Appl. No.: 14/035,194

(22) Filed: Sep. 24, 2013

(65) Prior Publication Data

US 2014/0024522 A1    Jan. 23, 2014

Related U.S. Application Data

(62) Division of application No. 12/943,547, filed on Nov. 10, 2010.

(30) Foreign Application Priority Data

Nov. 10, 2009 (KR) .......................... 10-2009-0107802

(51) Int. Cl.
    *B01J 37/34*    (2006.01)
    *B01J 31/06*    (2006.01)
    *B01J 23/28*    (2006.01)
    *B01J 23/42*    (2006.01)
    *B01J 23/75*    (2006.01)
    (Continued)

(52) U.S. Cl.
    CPC .............. *B01J 37/341* (2013.01); *B01J 23/28* (2013.01); *B01J 23/42* (2013.01); *B01J 23/75* (2013.01); *B01J 23/755* (2013.01); *B01J 31/06* (2013.01); *B01J 35/002* (2013.01); *B01J 35/006* (2013.01); *B01J 35/1014* (2013.01); *B01J 35/1019* (2013.01); *B01J 37/0201* (2013.01); *B01J 37/0207* (2013.01); *B01J 37/34* (2013.01);
    (Continued)

(58) Field of Classification Search
    None
    See application file for complete search history.

(56) References Cited

U.S. PATENT DOCUMENTS

| 5,653,951 A | 8/1997 | Rodriguez et al. |
| 2009/0176646 A1* | 7/2009 | Kim et al. ..................... 502/172 |
| 2011/0111948 A1 | 5/2011 | Kim et al. |

FOREIGN PATENT DOCUMENTS

| CN | 101 780 952 | 7/2010 |
| EP | 0299637 | 1/1989 |

(Continued)

OTHER PUBLICATIONS

European Search Report relating to European Application No. 10 19 0438.1-2104, dated Feb. 14, 2011.

(Continued)

*Primary Examiner* — Yun Qian
(74) *Attorney, Agent, or Firm* — Renner, Otto, Boisselle & Sklar, LLP

(57) ABSTRACT

The present disclosure relates to a catalyst having metal catalyst nanoparticles supported on natural cellulose fibers and a method of preparing the same, whereby natural cellulose fibers are subjected to specific pretreatment to increase a surface area and form defects on the surface thereof and metal catalyst nanoparticles are then supported on the cellulose catalyst support in a highly dispersed state, thereby providing improved catalysis while allowing production of the catalyst at low cost. The catalyst may be utilized for various catalytic reactions.

11 Claims, 7 Drawing Sheets

(51) Int. Cl.
*B01J 23/755* (2006.01)
*B01J 35/00* (2006.01)
*B01J 35/10* (2006.01)
*B01J 37/02* (2006.01)
*C01B 3/40* (2006.01)
*C01B 31/08* (2006.01)
*C10G 2/00* (2006.01)

(52) U.S. Cl.
CPC ............. *B01J37/343* (2013.01); *C01B 3/40* (2013.01); *C01B 31/081* (2013.01); *C10G 2/332* (2013.01); *C10G 2/333* (2013.01); *C01B 2203/1052* (2013.01); *C10G 2300/70* (2013.01)

(56) References Cited

FOREIGN PATENT DOCUMENTS

| | | |
|---|---|---|
| EP | 1156543 | 11/2001 |
| EP | 2050494 | 4/2009 |
| JP | S 50-143789 | 11/1975 |
| JP | 01-159055 A | 6/1989 |
| JP | 10-118493 A | 5/1998 |
| JP | 11-179213 A | 7/1999 |
| JP | 2001-325964 A | 11/2001 |
| JP | 2005 025947 | 1/2005 |
| JP | 2006-167580 A | 6/2006 |
| JP | 2008-006350 A | 1/2008 |
| JP | 2009-072761 | 4/2009 |
| JP | 2009-160569 A | 7/2009 |
| KR | 10-2009-0102176 A | 9/2009 |
| WO | 2010/095574 A1 | 8/2010 |

OTHER PUBLICATIONS

Kunchan et al., "Progress in the synthesis of carbon nanotube and nonofiber-supported Pt electrocatalysts for PEM fuel cell catalysis", Journal of Applied Electrochemistry, Kluwer Academic Publishers, DO, vol. 36, No. 5, May 1, 2006, pp. 507-522.

Lohse et al., "Applications of Colloidal Inorganic Nanoparticles: From Medicine to Energy", Journal of the American Chemical Society, vol. 134, 2012, pp. 15607-15620.

Han et al., "Abstracts of Papers", 274 ACS National Meeting, Anaheim, CA, United States, Mar. 28-Apr. 1, 2004.

* cited by examiner

CATALYSTS HAVING METAL NANO-PARTICLE CATALYST SUPPORTED ON SURFACE-TREATED NATURAL CELLULOSE FIBERS AND PREPARATION METHOD THEREOF

CROSS-REFERENCE TO RELATED APPLICATION(S)

This application is a divisional of U.S. application Ser. No. 12/943,547 filed Nov. 10, 2010, and claims the benefit of Korean Patent Application No. 10-2009-0107802, filed with the Korean Intellectual Property Office on Nov. 10, 2009, the disclosures of which are incorporated herein by reference in their entireties.

BACKGROUND

1. Technical Field

The present disclosure relates to a catalyst having metal catalyst nanoparticles supported on natural cellulose fibers and a method of preparing the same, whereby natural cellulose fibers are subjected to specific pretreatment to increase a surface area and form defects on the surface thereof and metal catalyst nanoparticles are then supported on the natural cellulose fibers in a highly dispersed state, thereby providing improved catalysis while allowing production of the catalyst at low cost.

2. Description of the Related Art

In the field of catalysts, two major issues have been actively studied in recent years. One is to prepare a support having a large surface area and a uniform pore distribution adequate for a corresponding reaction while guaranteeing physical and chemical stability and the other is to prepare a catalyst exhibiting maximum activity at minimum cost by supporting catalyst nanoparticles in a highly dispersed state. The present disclosure relates to preparing a catalyst support having good porosity and a large surface area from a biomaterial while allowing easy support of nanocatalyst.

Various methods of processing various biomaterials into carbon materials through pretreatment have been proposed. O. Ioannidou et al. (Renewable and Sustainable Energy Reviews 11 (2007) 1966-2005) disclose a procedure for processing various agricultural residues into activated carbon. Applicable agricultural residues include wheat, corn straw, olive pits, bagasse, birch wood, miscanthus, sunflower shells, pine cones, rapeseed, cotton residues, olive residues, Eucalyptus maculata, sugar cane bagasse, almond shells, peach pits, grape seeds, straw, oat husks, corn stover, apricot pits, cotton stalks, cherry pits, peanut shells, nut shells, rice husks, corncobs, corn husks, hazelnut shells, pecan shells, rice husks, rice straw, etc., which are activated and processed into materials with a surface area of hundreds to thousands of $m^2/g$. It should be noted that, since the raw materials have significantly varying characteristics, different materials are used for different purposes. It is also disclosed that materials containing more lignin tend to have more macropores after activation and those containing more fibers (cellulose) tend to have more micropores following activation.

Fibrous biomaterials like henequen fibers are suitable for use as a catalyst support having physical/chemical durability because of their characteristic fiber bundle structure. Since henequen contains a lot of cellulose components, however, it yields a lot of micropores. Thus, special surface treatment is required to provide more mesopores than the micropores for application to catalytic reactions.

The inventors of the present disclosure carried out research to process fibrous biomaterials such as henequen having a lot of micropores due to rich cellulose components into physically/chemically durable catalyst supports, in particular, those appropriate for catalytic reaction. As a result, we found out that, through a series of electron beam treatment, heat treatment at high temperature and chemical surface treatment using henequen fibers as a raw material, a cellulose catalyst support could be prepared which has a large surface area and uniform pore distribution and allows easy support of metal catalyst in a highly dispersed state through introduction of functional groups to the surface thereof.

SUMMARY

One aspect of the present disclosure is to provide a catalyst having metal catalyst nanoparticles supported on natural cellulose fibers and a method of preparing the same, in which the metal catalyst nanoparticles are supported in a highly dispersed state on the natural cellulose fibers having a large surface area and uniform pore distribution, with functional groups introduced to the surface of the natural cellulose fibers through specific pretreatment of the natural cellulose fibers, thereby guaranteeing broad applicability to various catalytic reactions.

In accordance with one aspect, a method of preparing a catalyst having metal catalyst nanoparticles supported on natural cellulose fibers includes: treating natural cellulose fibers with an electron beam; heat-treating the electron beam-treated natural cellulose fibers; chemically treating the heat-treated natural cellulose fibers with an acidic solution to introduce an oxidizing group to a surface of the natural cellulose fibers to prepare a cellulose catalyst support; and supporting metal catalyst nanoparticles on the cellulose catalyst support by chemical vapor deposition or impregnation.

In accordance with another aspect, a catalyst having metal catalyst nanoparticles supported on natural cellulose fibers includes: a cellulose catalyst support pretreated to allow metal catalyst nanoparticles to be supported on a surface of natural cellulose fibers; and the metal catalyst nanoparticles supported on the cellulose catalyst support by chemical vapor deposition or impregnation.

BRIEF DESCRIPTION OF THE DRAWINGS

The above and other features of the present disclosure will become apparent from the detailed description of the following embodiments in conjunction with the accompanying drawings.

DETAILED DESCRIPTION

Figure 1:
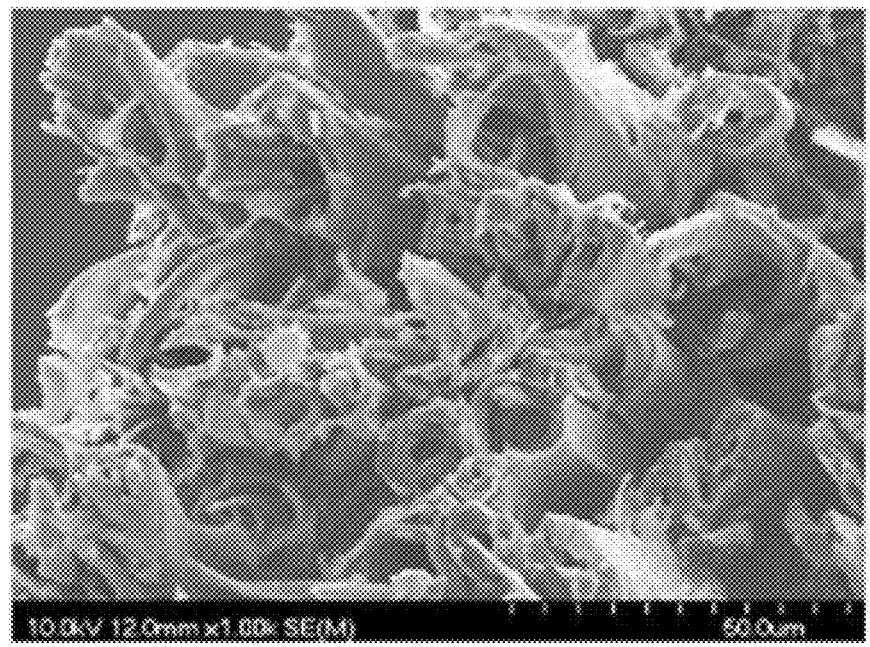
FIG. 1 is a scanning electron microscopic (SEM) image of the surface of a henequen fiber sample depending on electron beam intensity in Example 1.
Figure 2:
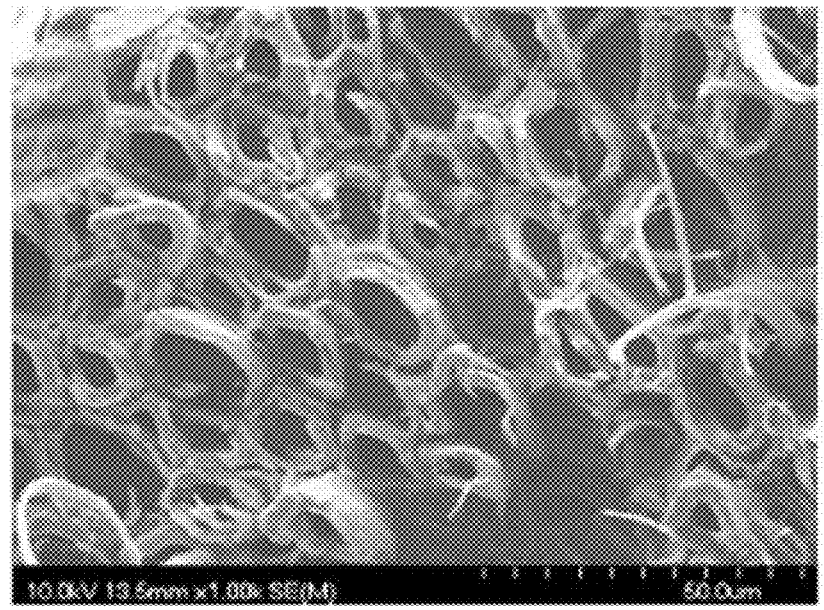
FIG. 2 is an SEM image of the surface of henequen fibers after electron beam treatment at 10 kGy in Example 1.
Figure 3:
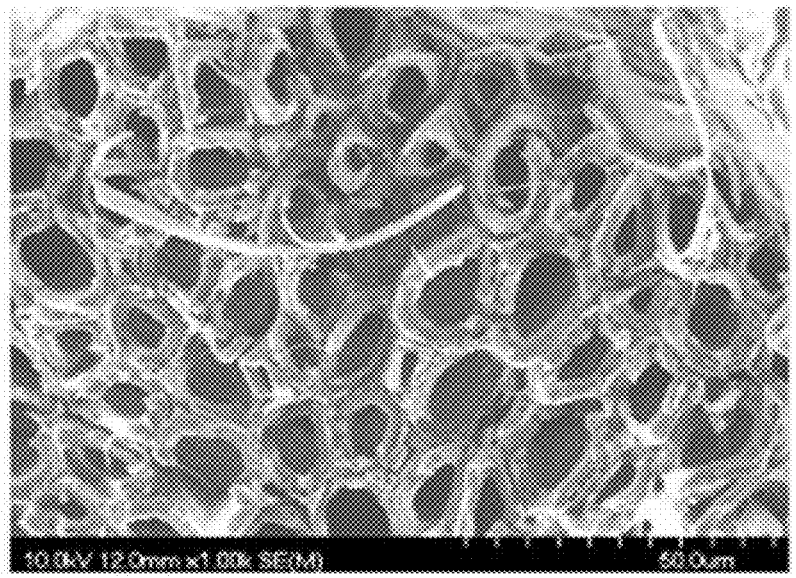
FIG. 3 is an SEM image of the surface of henequen fibers after electron beam treatment at 100 kGy in Example 1.
Figure 4:
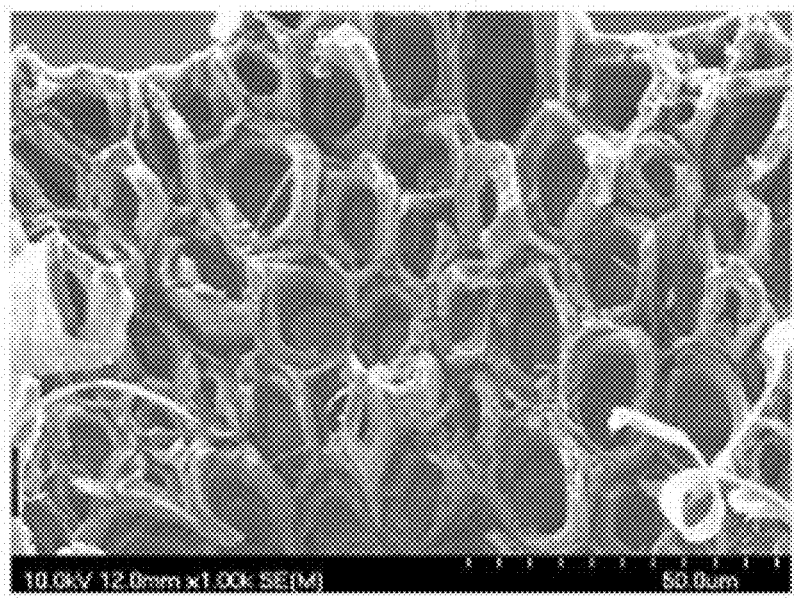
FIG. 4 is an SEM image of the surface of henequen fibers after electron beam treatment at 150 kGy in Example 1.
Figure 5:
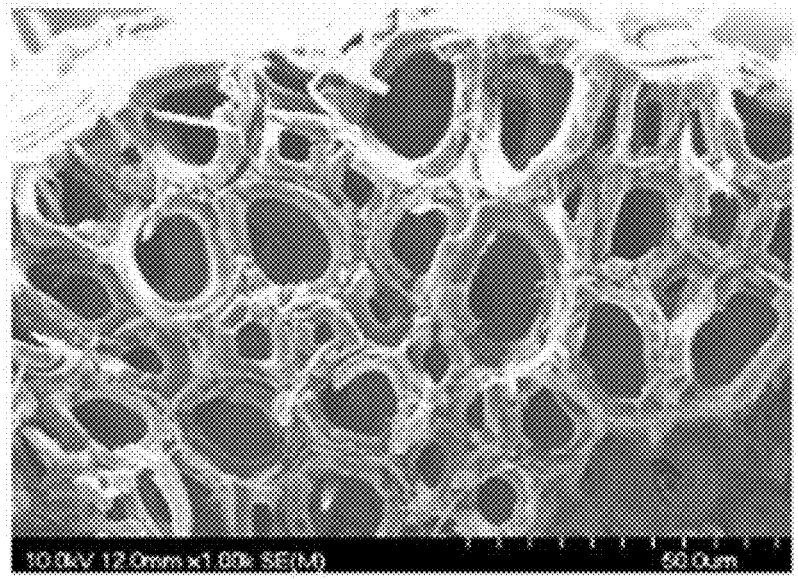
FIG. 5 is an SEM image of the surface of henequen fibers after electron beam treatment at 200 kGy in Example 1.
Figure 6:
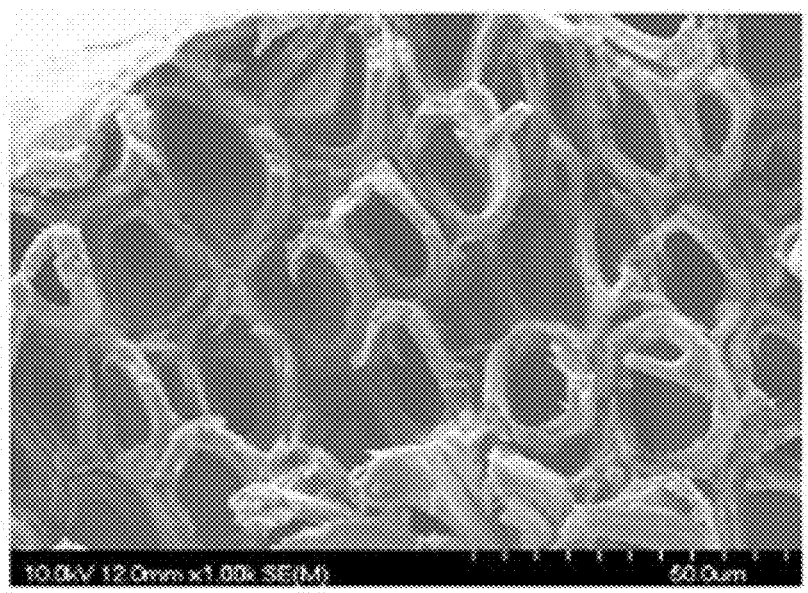
FIG. 6 is an SEM image of the surface of henequen fibers after electron beam treatment at 500 kGy in Example 1.

Exemplary embodiments of the present disclosure will now be described in detail with reference to the accompanying drawings.

One aspect of the present disclosure provides a method of preparing a catalyst having metal catalyst nanoparticles supported on natural cellulose fibers. The method includes: treating natural cellulose fibers with an electron beam (Process 1); heat-treating the electron beam-treated natural cellulose fibers (Process 2); chemically treating the heat-treated natural cellulose fibers with an acidic solution to introduce an oxidizing group to a surface of the natural cellulose fibers to prepare a cellulose catalyst support (Process 3); and supporting metal catalyst nanoparticles on the cellulose catalyst support by chemical vapor deposition or impregnation (Process 4).

The method of preparing a catalyst having metal catalyst nanoparticles supported on natural cellulose fibers will now be described in more detail.

Process 1 is a process of treating natural cellulose fibers with an electron beam to remove impurities oxidized at low temperature from the natural cellulose fibers.

According to the present disclosure, henequen fibers may be used as the natural cellulose fibers.

In one embodiment, electron beam treatment is performed by placing untreated henequen fibers in a polyethylene bag and irradiating an electron beam of 10~500 kGy to the henequen fibers from an electron gun. The electron gun may have a maximum acceleration energy of 1.0 MeV. During irradiation of the electron beam, an inlet of the plastic bag may be slightly opened to remove water and ozone produced during electron beam irradiation, thereby minimizing effects of water and ozone on the henequen fibers.

Process 2 is a process of heat-treating the electron beam-treated natural cellulose fibers to remove impurities from the natural cellulose fibers while improving surface area and porosity thereof.

In one embodiment, the electron beam-treated natural cellulose fibers are separated into thin fibers of tens to hundreds of pm and then cut into short fibers of 1 to 2 mm in length, with the natural cellulose fibers submerged in liquid nitrogen.

Then, the cut natural cellulose fibers are heated from 500 to 1500° C. at a rate of 5 to 20° C./min under in an atmosphere composed of a 1:1 mixture of hydrogen and nitrogen. Subsequently, the temperature is maintained at 500 to 1500° C. for 0.5 to 2 hours to carbonize the natural cellulose fibers. Alternatively, the temperature may be maintained in the range of 500 to 1000° C. for 0.5 to 2 hours. Advantageously, the temperature may be maintained at 700° C. for 0.5 to 2 hours. During this process, impurities are removed from the natural cellulose fibers, so that the thickness of the natural cellulose fibers may be decreased and the spaces previously occupied by the impurities (such as wax or fat components) may remain as pores.

Process 3 is a process of chemically treating the heat-treated henequen fibers with an acidic solution for introduction of an oxidizing group to the surface of the natural cellulose fibers to prepare a cellulose catalyst support. More specifically, in Process 3, the heat-treated natural cellulose fibers may be subjected to chemical treatment with the acidic solution for introduction of the oxidizing group such as CO—, CH—, O—C=O, $CO_2$, or $CO_3$ to the surface of the natural cellulose fibers to prepare the cellulose catalyst support.

In one embodiment, in the process of chemically treating the heat-treated natural cellulose fibers, the heat-treated natural cellulose fibers are immersed in 0.1~0.5 mol sulfuric acid aqueous solution and then subjected to sweeping in 10~60 cycles at −0.15~1.3 V at a sweep rate of 50 mV/s. Then, the natural cellulose fibers may be immersed in a 30% nitric acid solution (or 14N nitric acid solution) and chemically treated at 100~150° C. for 10~20 minutes under reflux. Alternatively, the natural cellulose fibers may be immersed in a mixture solution of nitric acid (14M, 50 mL) and sulfuric acid (98%, 50 mL) or in a solution of 98% sulfuric acid and 70% nitric acid in a volume ratio of 3:1 and treated at 50~70° C. for 5 minutes to 6 hours under reflux. After sufficiently washing the chemically treated natural cellulose fibers with distilled water and filtering, the natural cellulose fibers are dried at 110° C. for 12 hours, thereby providing a cellulose catalyst support.

Process 4 is a process of supporting metal catalyst nanoparticles on the cellulose catalyst support by chemical vapor deposition or impregnation.

Examples of the metal catalyst nanoparticles to be supported on the prepared cellulose catalyst support include, but are not limited to, platinum nanoparticles, nickel nanoparticles, cobalt nanoparticles, and molybdenum nanoparticles. To allow the metal catalyst nanoparticles such as platinum nanoparticles, nickel nanoparticles, cobalt nanoparticles or molybdenum nanoparticles to be supported on the cellulose catalyst support, chemical vapor deposition or impregnation may be used.

In one embodiment, the process of supporting the metal catalyst nanoparticles on the cellulose catalyst support by chemical vapor deposition may be carried out as follows. First, the cellulose catalyst support subjected to pretreatment of Processes 1 to 3 are placed at the center of a quartz tube in the middle of a furnace, and impurities are removed from the quartz tube by maintaining the quartz tube at a pressure of 6~10 Torr at 110~120° C. for 30~120 minutes. Then, a nitrogen flow (50~300 sccm) is supplied thereto for over 1 hour. In this process, the internal temperature of the quartz tube is elevated to 80~300° C. at a rate of 10° C./minute and a vapor metal precursor flow is initiated once the reaction temperature is reached, so that the metal catalyst nanoparticles can be supported on the cellulose catalyst support. The metal precursor is injected in advance into a vaporator disposed in a heating oven. For example, in the case of using a platinum precursor (MeCpPtMe$_3$) as the metal precursor, the platinum precursor is heated to 60~80° C. and a stopcock of a connection tube is opened once the reaction temperature is reached, so that the gaseous metal precursor can be conveyed to the cellulose catalyst support within the reactor. The cellulose catalyst support is maintained at a reaction temperature of 80~300° C. for 30 minutes to 24 hours, and the amount of metal catalyst nanoparticles supported on the cellulose catalyst support increases with increasing reaction time. As the platinum precursor, Pt(Me)$_3$(Cp), Pt(Tfacac)$_2$, Pt(Me)(CO)(Cp), Pt(Me)$_2$(COD), [PtMe$_3$(acac)]$_2$(acac; acetylacetonato ligand), PtCl$_2$(CO)$_2$, Pt(PF$_3$)$_4$, Pt(acac)$_2$, or Pt(C$_2$H$_4$)$_3$ may also be used. Examples of the nickel precursor include, but are not limited to, nickel nitrate (Ni(NO$_3$)$_2$) and nickel tetracarbonyl (Ni(CO)$_4$). Examples of the cobalt precursor include, but are not limited to, Co(CO)$_3$NO and Co(NO$_3$)$_2$, and an example of the molybdenum precursor includes Mo(CO)$_6$. In this process, chemical vapor deposition provides an advantage of effectively increasing the amount of metal catalyst nanoparticles supported on the cellulose catalyst support without increasing the size of the metal catalyst nanoparticles or decreasing the degree of dispersion thereof even in the case of increased reaction time. In another embodiment, the process of supporting the metal catalyst nanoparticles on the cellulose catalyst support by impregnation may be carried out as follows. First, any of the aforementioned metal precursors may be used to support the metal catalyst nanoparticles on the cellulose catalyst support after obtaining the metal catalyst nanoparticles through pretreatment of Processes 1 to 3. The pretreated cellulose catalyst support is deposited in an aqueous solution (0.1~1 mol) of a metal precursor, subjected to ultrasonication for 5 minutes to 3 hours, and remains in the solution for 12 hours. The resulting cellulose catalyst support in a slurry state is filtered from the solution, dried in an oven at 100~120° C. for over 12 hours, and burnt in a furnace of 400 to 600° C. for 2~6 hours under nitrogen atmosphere. As a result, a catalyst having the metal catalyst nanoparticles supported on the cellulose catalyst support may be obtained.

Another aspect of the present disclosure provides a catalyst having metal catalyst nanoparticles supported on natural cellulose fibers. The catalyst includes: a cellulose catalyst support pretreated to allow metal catalyst nanoparticles to be supported on a surface of natural cellulose fibers; and the metal catalyst nanoparticles supported on the cellulose catalyst support by chemical vapor deposition or impregnation.

The cellulose catalyst support pretreated to allow the metal catalyst nanoparticles to be supported on the surface of the natural cellulose fibers may be prepared by treating natural cellulose fibers with an electron beam; heat-treating the electron beam-treated natural cellulose fibers; and chemically treating the heat-treated natural cellulose fibers with an acidic solution to introduce an oxidizing group to the surface of the natural cellulose fibers.

The pretreatment for preparing the cellulose catalyst support is performed under the same conditions as the pretreatment of Processes 1 to 3 described above in the method of preparing the catalyst having metal catalyst nanoparticles supported on the natural cellulose fibers.

The catalyst having platinum catalyst nanoparticles supported on the cellulose catalyst support is suitable for hydrogenation of tetralin or benzene, oxidation of methanol, ethanol or phenol, and the like.

The catalyst having nickel catalyst nanoparticles or molybdenum nickel catalyst nanoparticles supported on the cellulose catalyst support is well suited for desulfurization, denitrification, demetallation, and the like.

The catalyst having cobalt catalyst nanoparticles supported on the cellulose catalyst support may be used as a co-catalyst for desulfurization, denitrification, or demetallation. Specifically, the catalyst having the cobalt catalyst nanoparticles supported on the cellulose catalyst support may be used as a co-catalyst for platinum catalysts in fuel cells, catalysts for Fisher-Tropsch reaction, catalysts for oxidation and partial oxidation of hydrocarbons, catalysts for reforming reactions, catalysts for amination of ethanol or the like, catalysts for hydrogenation, catalysts for water-gas shift reactions, and the like.

Next, the present disclosure will be described with reference to examples. It should be understood that the present disclosure is not limited to the following examples and may be embodied in different ways, and that these examples are given to provide complete disclosure of the invention and to provide thorough understanding of the present disclosure to those skilled in the art. The scope of the present disclosure is limited only by the accompanying claims and equivalents thereof.

EXAMPLES

Example 1

Preparation of Cellulose Catalyst Support Using Henequen Fibers and Preparation of Nickel (Ni) Nanocatalyst Using the Same as Catalyst Support (1) Electron Beam Treatment for Removing Impurities from Henequen Fiber Henequen fibers were subjected to electron beam treatment to remove impurities oxidized at low temperature therefrom. For electron beam treatment, untreated henequen fibers were placed in a polyethylene bag and an electron beam of 10 to 500 kGy was irradiated thereto from an electron accelerator (ELV-4 type, EB Tech Co., Ltd.). During electron beam irradiation, the inlet of the plastic bag was slightly opened to remove water and ozone produced during the electron beam irradiation to minimize the effects thereof on the henequen fibers. The maximum acceleration energy of the electron gun was 1.0 MeV. The electron beam irradiation was carried out in air while moving the sample at a constant speed of 10 m/min on a conveyor belt with the current set at 4.95 mA.

(2) Heat Treatment of Electron Beam-Treated Henequen Fibers for Removal of Impurities and Improvement of Surface Area and Porosity The electron beam-treated henequen fibers were heat-treated under specific heat treatment conditions to remove impurities and improve surface area and porosity. The electron beam-treated henequen fibers were separated into thin fibers of tens to hundreds of pm and then cut into short fibers of 1 to 2 mm in length after impregnating the fibers in liquid nitrogen. The cut henequen fibers were heated to 500~1500° C. at a rate of 5~20° C./min under an atmosphere of a 1:1 mixture of hydrogen and nitrogen. Then, the temperature was maintained at 500 to 1500° C. for 1 hour to carbonize the henequen fibers.

(3) Chemical Treatment of Heat-Treated Henequen Fibers for Introduction of Functional Groups to Allow Easy Support of Metal Catalyst Nanoparticles The heat-treated henequen fibers were immersed in 0.5M aqueous sulfuric acid solution and subjected to sweeping in 10 to 60 cycles from −0.15 to 1.3 V at a sweep rate of 50 mV/s. The henequen fibers were immersed in a mixture of nitric acid (14M, 50 mL) and sulfuric acid (98%, 50 mL) and then chemically treated at 60° C. for 10 minutes under reflux. After sufficiently washing the sample with distilled water and filtering, the treated sample was dried at 110° C. for 12 hours. As a result, a cellulose catalyst support was prepared.

(4) Supporting of Metal Catalyst Nanoparticles on Cellulose Catalyst Support by Chemical Vapor Deposition To support the Ni nanocatalyst on the surface of the resulting cellulose catalyst support by chemical vapor deposition, the obtained cellulose catalyst support was placed in a quartz tube positioned in the middle of a furnace. After maintaining the tube at a pressure of 6 Torr at 110° C. for 30 minutes to remove impurities from the inside of the quartz tube, nitrogen (100 sccm) was supplied thereto for over 1 hour. Then, after adding $Ni(CO)_4$ to a vaporizer, $N_2$ was supplied while keeping the temperature at 35° C., so that the gaseous nickel precursor ($Ni(CO)_4$) could be conveyed to the cellulose catalyst support in the reactor. As a result, a catalyst having Ni nanoparticles supported on the cellulose catalyst support was obtained. It was observed that the amount of the Ni nanoparticles supported on the cellulose catalyst support increased with reaction time.

Example 2

Preparation of Cellulose Catalyst Support Using Henequen Fibers and Preparation of Ni Nanocatalyst Using the Same as Catalyst Support A Ni nanocatalyst was prepared in the same manner as Example 1, except that Ni nanoparticles were supported on the cellulose catalyst support by impregnation.

The pretreated cellulose catalyst support was deposited in an aqueous solution (1M) of a metal precursor $Ni(CO)_4$. After ultrasonication for 1 hour, the catalyst support was allowed to stand in solution for 12 hours. The resulting cellulose catalyst support in slurry state was filtered from the solution, dried in an oven at 100 to 120° C. for over 12 hours, followed by burning in a furnace at 400 to 600° C. for 3 hours under nitrogen atmosphere. As a result, a catalyst having Ni nanoparticles supported on the cellulose catalyst support was obtained.

COMPARATIVE EXAMPLE

Comparative Example 1

Preparation of Ni Catalyst Supported on Alumina by Initial Impregnation Using Commercially Available γ-Alumina as Catalyst Support (1) Supporting of Ni Precursor on γ-alumina by Initial Impregnation γ-Alumina (γ-$Al_2O_3$, 97%, Strem) was used as a support, and a 1M aqueous precursor solution was prepared by dissolving nickel nitrate ($Ni(NO_3)_2$) as a Ni precursor in distilled water. Then, after drying the alumina in an oven of 110° C. for over 12 hours, a Ni catalyst supported on alumina was prepared by initial impregnation.

(2) Preparation of Metal Oxide Catalyst Through Drying and Burning

The Ni precursor-supported catalyst prepared by initial impregnation was dried in an oven at 110° C. for over 12 hours and treated in a furnace at 450° C. for 4 hours under nitrogen atmosphere. As a result, a nickel oxide catalyst supported on alumina was obtained.

TEST EXAMPLE

Test Example 1

Change in Surface Shape of Henequen Fibers Depending on Electron Beam Intensity

The change in the surface shape of the henequen fibers treated with electron beams (electron beam intensity=10~500 KGy) in Process 1 of Example 1 was observed by scanning electron microscopy (SEM). Results are shown in FIGS. 1 to 6.

As shown in FIG. 1, the original henequen fiber sample had pores with an inner channel size of about 2~5 μm. As seen in FIGS. 2 to 6, the inner channels increased to a diameter of approximately 10 μm while maintaining a relatively uniform shape.

Test Example 2

Change in Surface Area Depending on Heat Treatment of Henequen Fiber

In Process 2 of Example 1, the electron beam-treated henequen fibers (treated at 10 kGy and 100 kGy) were subjected to heat treatment under various conditions. BET surface area measurement was performed and results are shown in Table 1. The heat treatment was carried out while supplying a mixture of hydrogen and nitrogen having a volume ratio of 1:1. The heat treatment temperature was varied from 500 to 1500° C.

TABLE 1

| | BET surface area (m2/g) | |
|---|---|---|
| Heat treatment temperature (° C.)[a] | Henequen fibers (10 kGy) | Henequen fibers (100 kGy) |
| Before[b] | 6 | 5 |
| 500 | 230 | 263 |
| 700 | 355 | 360 |
| 800 | 372 | 374 |
| 1000 | 380 | 383 |
| 1200 | 122 | 121 |
| 1500 | 50 | 50 |

[a]Heat-treated for 1 hour under nitrogen and hydrogen atmosphere
[b]Before heat treatment As can be seen from Table 1, the henequen fibers treated only with electron beams had a small surface area of 5 or 6 $m^2/g$. Upon heat treatment at 500° C., the surface area of the henequen fibers increased considerably to 230 or 263 $m^2/g$. This is because the impurities in channels and pores were removed by the heat treatment and only stable components at high temperature remained. The surface area of the henequen fibers increased with the heat treatment temperature. However, above 1000° C., the surface area decreased abruptly. This is because the components constituting the inner structure of the henequen fibers are partially decomposed at high temperature. For this reason, the henequen fibers treated at 1500° C. had a surface area of only about 50 $m^2/g$.

Test Example 3

Change in Shape of Henequen Fibers Depending on Heat Treatment Conditions

SEM analysis was performed on the henequen fibers treated in Processes 1 and 2 of Example 1. The results are shown in FIGS. 7 to 10.

Figure 7:
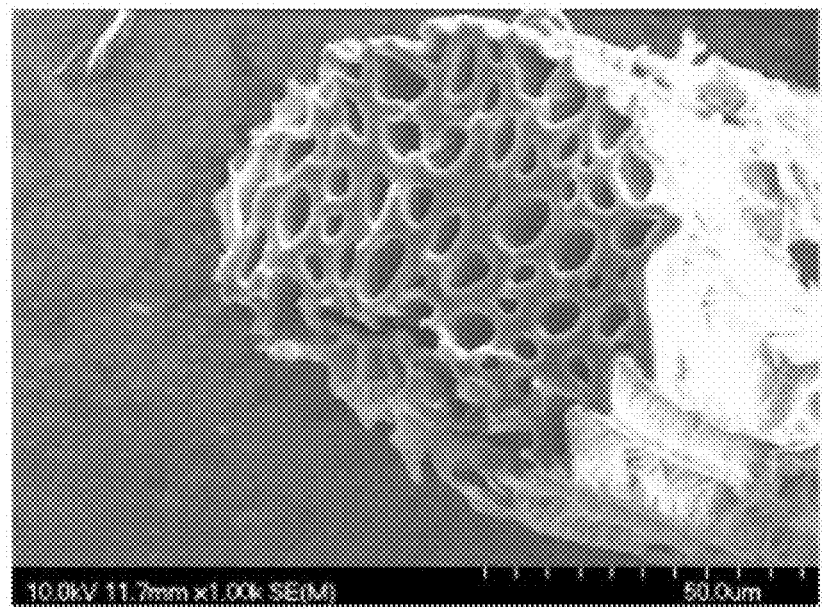
FIG. 7 is an SEM image of the surface of henequen fibers after heat treatment at 500° C. following electron beam treatment.
Figure 8:
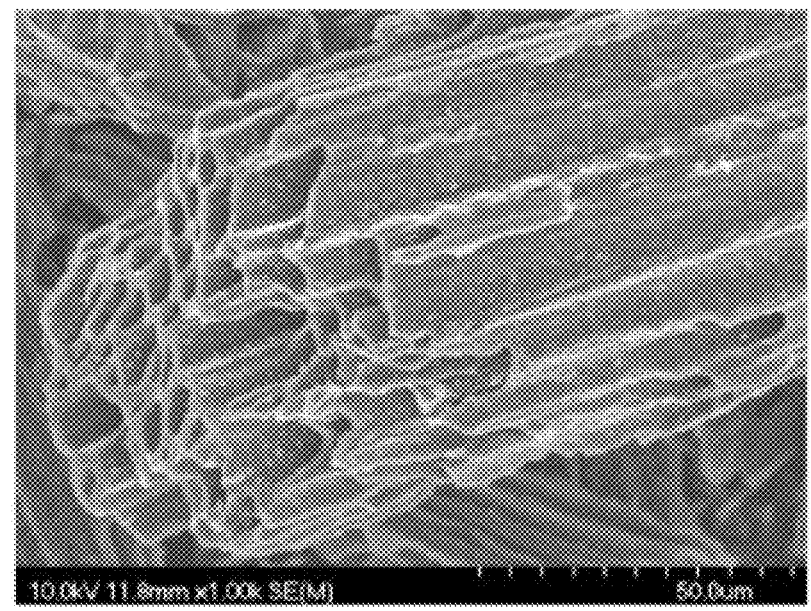
FIG. 8 is an SEM image of the surface of henequen fibers after heat treatment at 700° C. following electron beam treatment.
Figure 9:
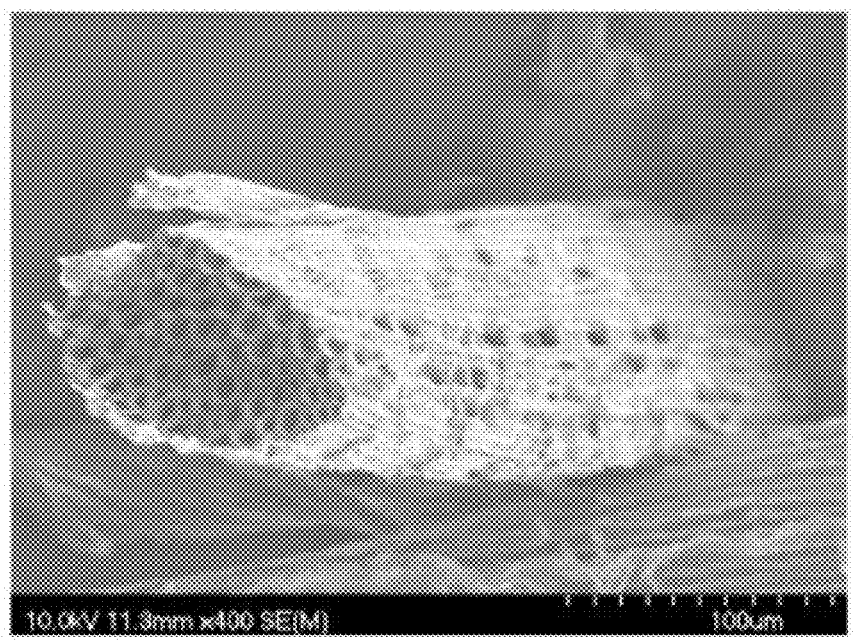
FIG. 9 is an SEM image of the surface of henequen fibers after heat treatment at 1000° C. following electron beam treatment.
Figure 10:
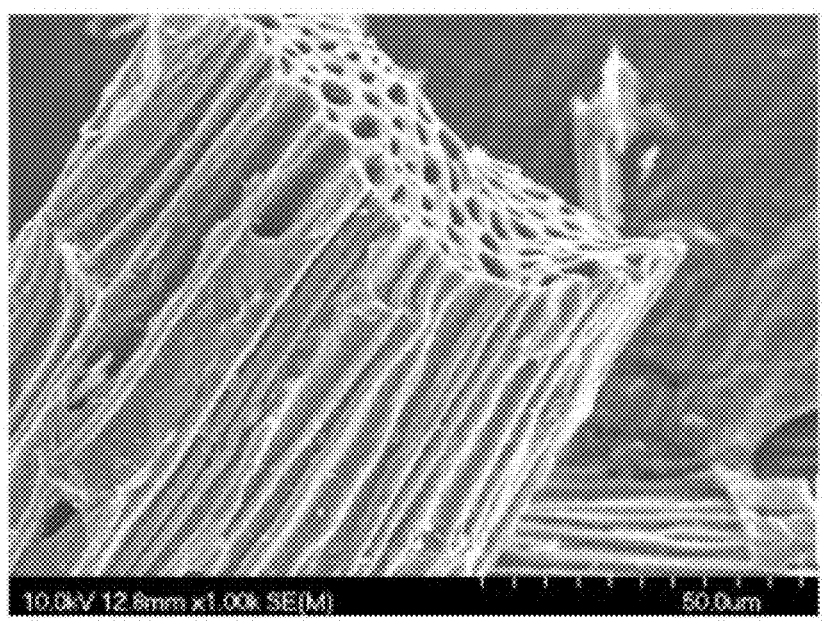
FIG. 10 is an SEM image of the surface of henequen fibers after heat treatment at 1500° C. following electron beam treatment.

FIG. 7 is an SEM image of the henequen fibers heat-treated at 500° C. for 1 hour while supplying a mixture of hydrogen and nitrogen having a volume ratio of 1:1. FIG. 8 is an SEM image of the henequen fibers heat-treated at 700° C. under the same conditions, FIG. 9 is an SEM image of the henequen fibers heat-treated at 1000° C., and FIG. 10 is an SEM image of the henequen fibers heat-treated at 1500° C. As can be seen from FIGS. 7 to 10, the walls of the inner channels of the henequen fibers gradually become thinner as the heat treatment temperature is increased. Also, it can be seen that the side surfaces of the fibers become rougher as the heat treatment temperature is increased. This may be because, as described above, the impurities included in the henequen fibers are removed as the heat treatment temperature increases.

Test Example 4

Change in Characteristics of Henequen Fibers Depending on Chemical Treatment Conditions The henequen fibers electron beam- and heat-treated in Processes (1) and (2) of Example 1 were subjected to chemical treatment in Process (3). In order to compare formation of oxidizing groups (CO—, CH—, O—C=O, $CO_2$, $CO_3$, etc.) on the surface of the henequen fiber, X-ray photoelectron spectroscopy (XPS) was carried out. Results thereof are shown in FIG. 11.

Figure 11:
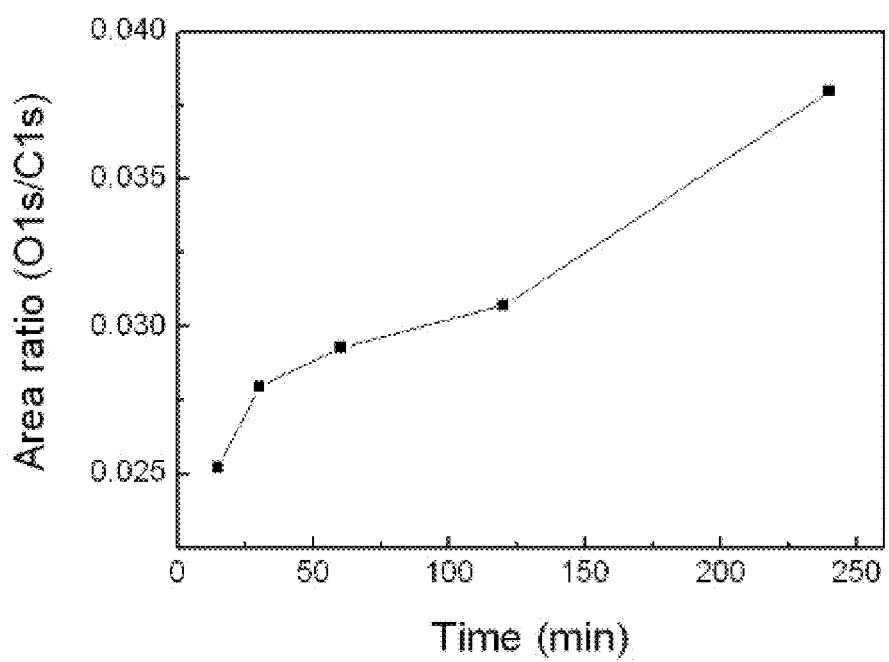
FIG. 11 shows results of analysis of functional groups introduced to the surface of henequen fibers after electron beam treatment, heat treatment and chemical treatment using X-ray photoelectron spectroscopy (XPS)

In FIG. 11, change in area ratio of O1s/C1s with increasing chemical treatment time is graphically represented in order to quantitatively compare the amount of O1s bonding and C1s bonding present in the cellulose catalyst support. As seen from FIG. 11, the quantity of oxidizing groups increased almost linearly with the increasing treatment time. Thus, it can be confirmed that defects are effectively formed on the surface of the henequen fibers through the acidic treatment.

Test Example 5

Figure 12:
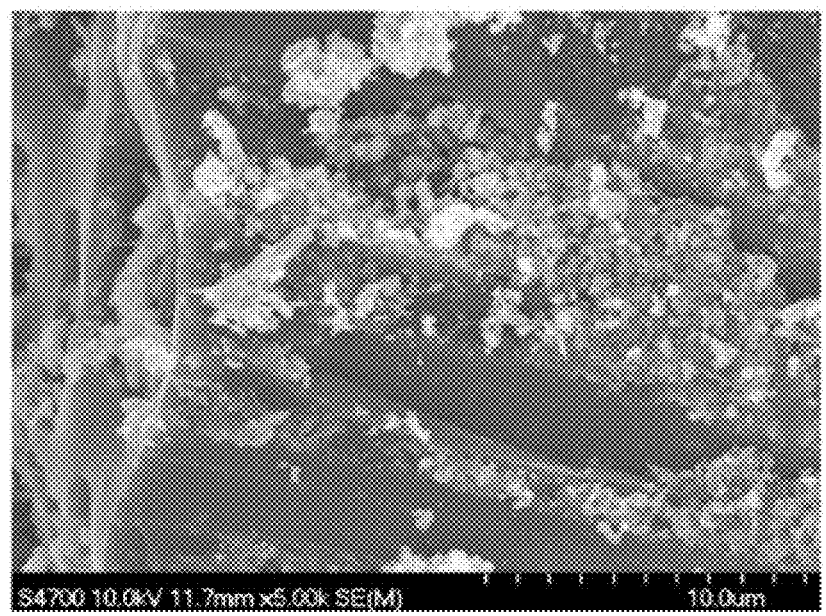
FIG. 12 is an SEM image of a nickel (Ni) catalyst supported on chemically treated henequen fibers by impregnation in Example 2.
Figure 13:
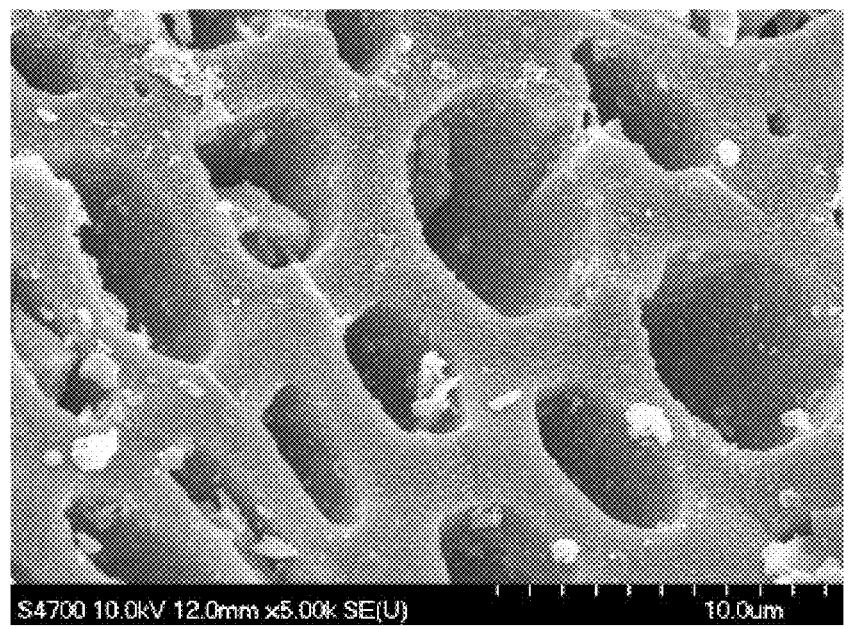
FIG. 13 is an SEM image of a Ni catalyst supported on non-chemically treated henequen fibers by impregnation in Example 2.

SEM Analysis Before and After Chemical Surface Treatment of Cellulose Catalyst Support The henequen fibers treated in Processes 1 and 2 of Example 1 were either left untreated (FIG. 12) or subjected to chemical treatment in Process 3 (FIG. 13). Subsequently, after preparing Ni catalysts supported on cellulose catalyst supports by impregnation as in Example 2, surface analysis was performed using SEM. Results thereof are shown in FIGS. 12 and 13. Chemical treatment conditions were as follows. First, the cellulose catalyst support was immersed in a 0.5M aqueous sulfuric acid solution and subjected to sweeping in 10 to 60 cycles from −0.15 to 1.3 V at a sweep rate of 50 mV/s. Then, the cellulose catalyst support was immersed in a mixture of nitric acid (14M, 50 mL) and sulfuric acid (98%, 50 mL) and chemically treated at 60° C. for 10 minutes under reflux. After sufficiently washing with distilled water and filtering, the treated sample was dried at 110° C. for 12 hours. Thus, a cellulose catalyst support was prepared.

As can be seen from FIG. 12, the non-chemically treated cellulose catalyst support showed agglomeration of Ni catalyst particles on the support surface, which resulted in a very low degree of dispersion. Also, since the active sites for catalytic reaction decrease as the particles agglomerate, the activity of catalytic reaction was significantly decreased. In contrast, as can be seen in FIG. 13, the chemically treated sample showed uniformly supported Ni particles on the support surface. This is attributed to the fact that the functional group such as CO— or CH— is introduced to the surface of the catalyst support through chemical treatment and the metal catalyst particles selectively bind to such defects, thereby allowing the metal catalyst particles to be supported on the catalyst support in a highly dispersed state.

Test Example 6

Figure 14:
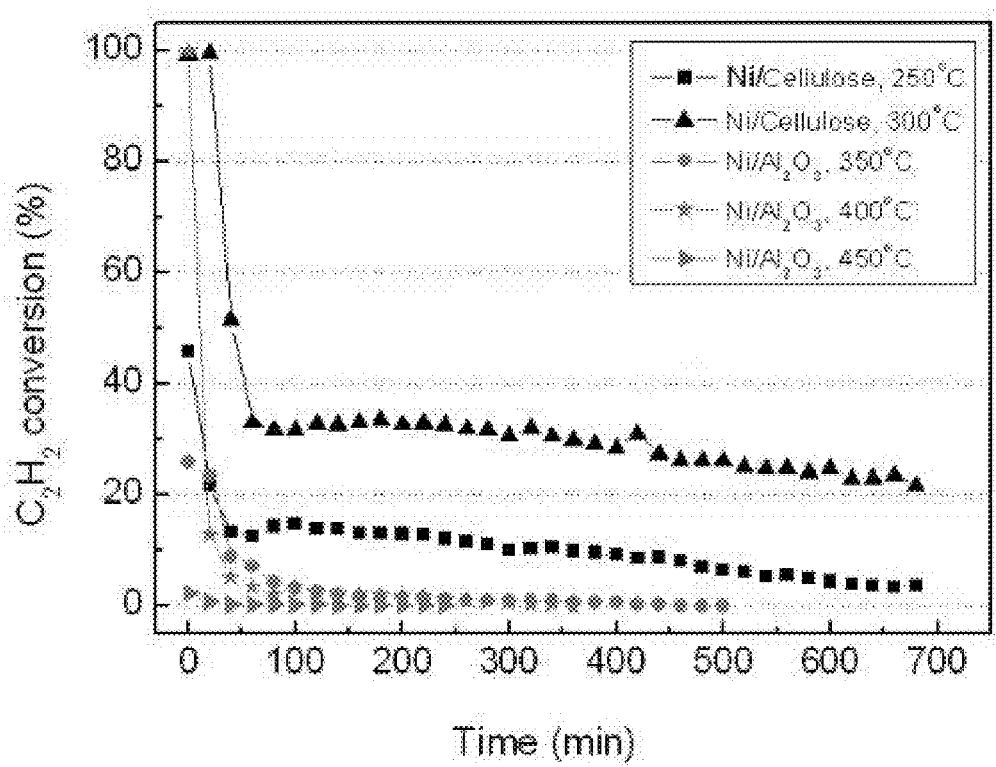
FIG. 14 shows results of performing pyrolysis of acetylene ($C_2H_2$) using a Ni catalyst supported on a cellulose catalyst support in Example 1 and a Ni catalyst supported on alumina in Comparative Example 1, respectively.

Catalytic Reaction Test Using Catalyst Supported on Cellulose Catalyst Support or Commercially Available Support Pyrolysis of acetylene was carried out using the catalysts prepared in Example 1 and Comparative Example 1. Results thereof are compared in FIG. 14.

Pyrolysis of acetylene was performed from 250° C. while increasing temperature in 50° C. intervals. The Ni catalyst supported on the cellulose catalyst support prepared in Example 1 showed initial reaction activity at 250° C. of about 47%). Reaction activity decreased rapidly to yield a conversion rate of about 14% after 1 hour. This is because cokes produced in the early stages of pyrolysis of acetylene cover the catalyst surface. The reaction activity gradually decreased to give a conversion rate of about 5% after 12 hours. When the reaction temperature was increased to 300° C., the acetylene conversion rate was almost 100% initially but decreased to about 37% within 1 hour. Thereafter, the Ni catalyst supported on the cellulose catalyst support prepared in Example 1 retained a reaction activity of about 23% even after 12 hours.

In contrast, when the $Ni/Al_2O_3$ catalyst prepared in Comparative Example 1 using the commercially available catalyst support was used, the reaction hardly proceeded at 300° C. When the reaction temperature was increased to 350° C., a reaction activity was temporarily observed initially, but it decreased to about 7% after 1 hour and a very low conversion rate was obtained thereafter. Reactivity barely increased even when the reaction temperature was increased above 350° C.

Thus, it can be seen that the cellulose catalyst support facilitates catalytic reactions such as pyrolysis of acetylene better than the existing alumina support and that deactivation of the catalyst by coke generation resulting from prolonged reaction occurs slower than in the alumina support.

The present disclosure provides a method for pretreating a physically/chemically durable catalyst support suitable for catalytic reactions from a fibrous biomaterial such as henequen fibers, which have a lot of micropores due to high cellulose content, by means of specific pretreatment. The resulting catalyst support has a large surface area and uniform pore distribution and has metal catalyst nanoparticles supported on the surface of the natural cellulose fibers where functional groups are introduced in a highly dispersed state. Thus, the catalyst support can be utilized for various catalytic reactions.

Although some embodiments have been described in the present disclosure, it should be understood that the embodiments are given by way of illustration only and do not limit the scope of the present disclosure, and that various modifications and changes can be made by a person having ordinary knowledge in the art without departing from the spirit and scope of the present disclosure, which are limited only by the accompanying claims and equivalents thereof.

What is claimed is:

1. A method of preparing a catalyst having metal catalyst nanoparticles supported on natural cellulose fibers, comprising:

(1) treating natural cellulose fibers with an electron beam by irradiating an electron beam of 10 to 500 kGy to the natural cellulose fibers;

(2) heat-treating the electron beam-treated natural cellulose fibers by cutting the electron beam treated natural cellulose fibers to a length of 1~2 mm in a state of being impregnated in liquid nitrogen, and heat-treating natural cellulose fibers at 500 to 1500° C. at a rate of 5 to 20° C./min under in an atmosphere composed of a 1:1 mixture of hydrogen and nitrogen, the temperature being maintained at 500 to 1500° C. for 0.5 to 2 hours to carbonize the natural cellulose fibers;

(3) chemically treating the heat-treated natural cellulose fibers with an acidic solution to introduce an oxidizing group to a surface of the natural cellulose fibers to prepare a cellulose catalyst support, wherein chemically treating the natural cellulose fibers comprises sweeping the heat-treated natural cellulose fibers in 10-60 cycles at −0.15-1.3 V at a sweep rate of 50 mV/s, with the heat-treated natural cellulose fibers immersed in a 0.1-0.5 M aqueous sulfuric acid solution, followed by chemically treating the natural cellulose fibers, with the natural cellulose fibers immersed in a 30% nitric acid solution at 100-150° C.; and (4) supporting metal catalyst nanoparticles directly on the surface of the cellulose catalyst support by chemical vapor deposition or impregnation, wherein through a series of electron beam treatment, heat treatment, and chemical treatment, the cellulose catalyst support has pores with an inner channel size of up to 10 μm and a BET surface area of 230-383 m$^2$/g, and functional groups introduced to a surface of the natural cellulose fibers.

2. The method of claim 1, wherein the electron beam treatment of the natural cellulose fibers comprises irradiating an electron beam of 10 to 500 kGy to the natural cellulose fibers.

3. The method of claim 1, wherein the heat treatment of the natural cellulose fibers comprises cutting the natural cellulose fibers to a length of 1~2 mm, with the natural cellulose fibers impregnated in liquid nitrogen, and heat-treating natural cellulose fibers at 500~1500° C. for 0.2 to 2 hours.

4. The method of claim 1, further comprising: washing and drying the chemically treated natural cellulose fibers to prepare the cellulose catalyst support.

5. The method of claim 1, wherein the oxidizing group introduced to the surface of the natural cellulose fibers comprises CO—, CH—, O—C=O, $CO_2$, or $CO_3$.

6. The method of claim 1, wherein the metal catalyst nanoparticles supported on the cellulose catalyst support by the chemical deposition or impregnation comprise platinum particles, and a platinum precursor for supporting the platinum particles on the cellulose catalyst support is selected from the group consisting of $MeCpPtMe_3$, $Pt(Me)_3(Cp)$, $Pt(Tfacac)_2$, $Pt(Me)(CO)(Cp)$, $Pt(Me)_2(COD)$, $[PtMe_3(acac)]_2$, $PtCl_2(CO)_2$, $Pt(PF_3)_4$, $Pt(acac)_2$, and $Pt(C_2H_4)_3$.

7. The method of claim 1, wherein the metal catalyst nanoparticles supported on the cellulose catalyst support by the chemical deposition or impregnation comprise nickel particles, and a nickel precursor for supporting the nickel particles on the cellulose catalyst support is nickel nitrate (Ni$(NO_3)_2$) or nickel carbonyl (Ni$(CO)_4$).

8. The method of claim 1, wherein the metal catalyst nanoparticles supported on the cellulose catalyst support by the chemical deposition or impregnation comprise cobalt particles, and a cobalt precursor for supporting the cobalt particles on the cellulose catalyst support is $Co(CO)_3NO$ or $Co(NO_3)_2$.

9. The method of claim 1, wherein the metal catalyst nanoparticles supported on the cellulose catalyst support by the chemical deposition or impregnation comprise molybdenum particles, and a molybdenum precursor for supporting the molybdenum particles on the cellulose catalyst support is $Mo(CO)_6$.

10. The method of claim 1, wherein the supporting the metal catalyst nanoparticles on the cellulose catalyst support by the chemical vapor deposition comprises removing impurities from within a quartz tube by placing the prepared cellulose catalyst support at a center of the quartz tube and maintaining the quartz tube at a pressure of 6~10 Torr at 110~120° C. for 30~120 minutes; elevating an internal temperature of the quartz tube having the cellulose catalyst support therein to 80~300° C.; and supplying a. gaseous metal precursor into the quartz tube under vacuum after a target reaction temperature is reached, thereby allowing the metal catalyst nanoparticles to be supported on the cellulose catalyst support.

11. The method of claim 1, wherein the supporting the metal catalyst nanoparticles on the cellulose catalyst support by the impregnation comprises depositing the prepared cellulose catalyst support in an aqueous solution of a metal precursor, ultrasonicating the cellulose catalyst support, drying the cellulose catalyst support, and burning the cellulose catalyst support in nitrogen atmosphere.

* * * * *